March 17, 1942. W. A. BRUNO 2,276,607
REMOTE CONTROL
Filed Feb. 7, 1941 5 Sheets-Sheet 1

William A. Bruno
INVENTOR.

BY Mock & Blum
ATTORNEYS

March 17, 1942.   W. A. BRUNO   2,276,607
REMOTE CONTROL
Filed Feb. 7, 1941   5 Sheets-Sheet 3

William A. Bruno
INVENTOR.
BY Mock & Blum
ATTORNEYS

March 17, 1942.     W. A. BRUNO     2,276,607
REMOTE CONTROL
Filed Feb. 7, 1941     5 Sheets-Sheet 4

William A. Bruno
INVENTOR.

BY Mock + Blum
ATTORNEYS

March 17, 1942.  W. A. BRUNO  2,276,607
REMOTE CONTROL
Filed Feb. 7, 1941  5 Sheets-Sheet 5
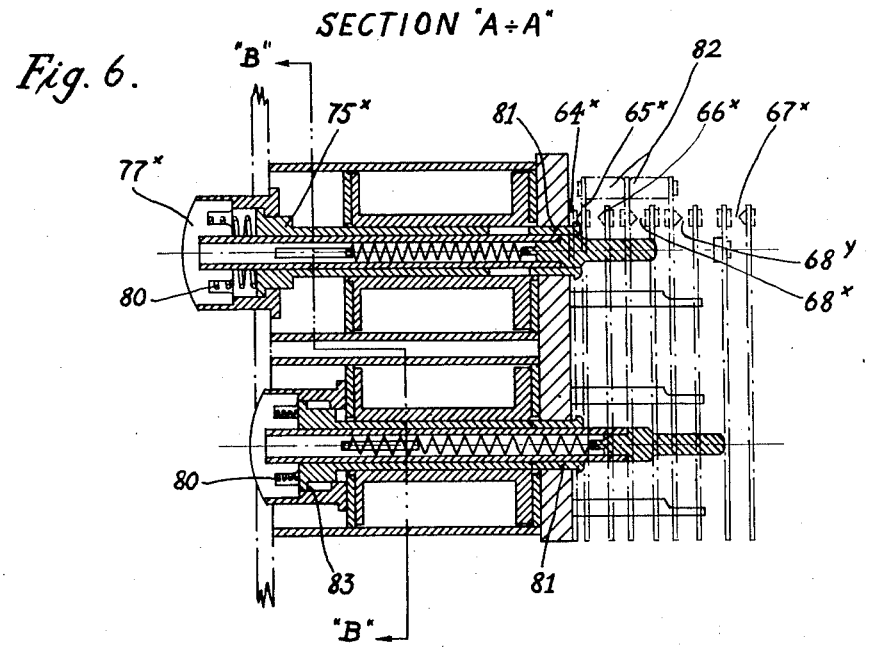
Fig. 6.
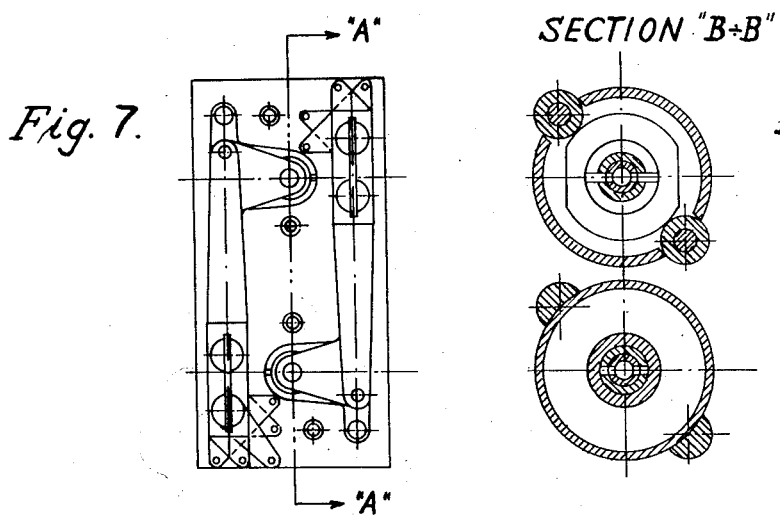
Fig. 7.
Fig. 8.
William A. Bruno
INVENTOR.
BY Mock & Blum
ATTORNEYS Patented Mar. 17, 1942

2,276,607

UNITED STATES PATENT OFFICE 2,276,607

REMOTE CONTROL

William A. Bruno, Astoria, Long Island, N. Y., assignor, by mesne assignments, to Bruno Patents Inc., Long Island City, N. Y., a corporation of New York Application February 7, 1941, Serial No. 377,858

13 Claims. (Cl. 175—320)

The present invention relates to coordinated control devices for the remote and local operation of electric circuits and more specifically to a system of coordinated control devices operated by means of depressible members.

Considerable difficulty has been met in providing, in air-planes or other vehicles, in which the space available is very limited, a system comprising two or more coordinated control devices, i. e. devices which are constructed and electrically connected in such a manner that the setting of one control device into the desired position in order to actuate local electric circuits of radio receiving or transmitting sets, for example, automatically causes setting of the other control device or devices into the same position.

The main object of the present invention is to provide such a system which comprises two or more control devices provided with depressible members, in which the actuation of a depressible member in one control device, automatically causes actuation of the corresponding depressible member in the other control device or devices.

It is another object of this invention to provide means for actuating the selected depressible member in one of the control devices manually, and for simultaneously and automatically actuating the corresponding depressible member in the other control device or devices, by electromagnetic means.

Still another object of the invention relates to the use of different amounts of energy for actuating and for retaining in their position, respectively, the members to be moved by electromagnetic means.

Yet another object of the invention is to provide means for interrupting the flow of electric current in the system of coordinated control devices and thereby cancelling the selected previous settings.

It is also an object of my present invention to provide a system of the above described character, in which the parts of the individual control devices can be assembled within a relatively very small space, and in which the assembled parts and their functions are not substantially affected by vibrations occurring in air-planes or other fast moving vehicles.

A further object of this invention is to limit the heating of the parts included in the apparatus according to said invention, to an amount which has no injurious influence on said parts and the normal functioning thereof.

The above and other objects and advantages of the invention will appear more fully hereinafter from the detailed description when taken in conjunction with the accompanying drawings. It is expressly understood, however, that the drawings are employed for purposes of illustration only, and are not designed as a definition of the limits of the invention, reference being had for this purpose to the appended claims.

In the drawings:

Fig. 6 shows details of a push button set adapted to be used in the arrangement shown in Fig. 5, and Figures 7 and 8 show details of the push button set shown in Fig. 6.

Figure 1A:
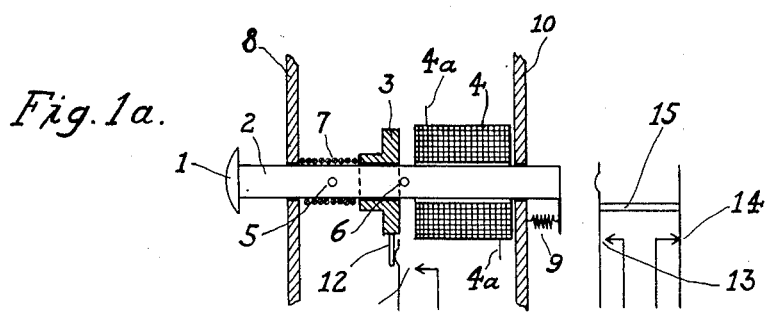
Figures 1a, 1b and 1c are diagrammatical views in three different positions of a push button system according to my present invention, i. e. in the rest position, in the position of the push button when it has been actuated manually, and the electrically retained position, respectively.
Figure 1B:
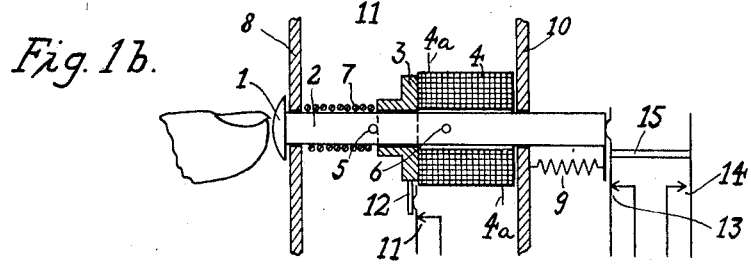
Figure 1C:
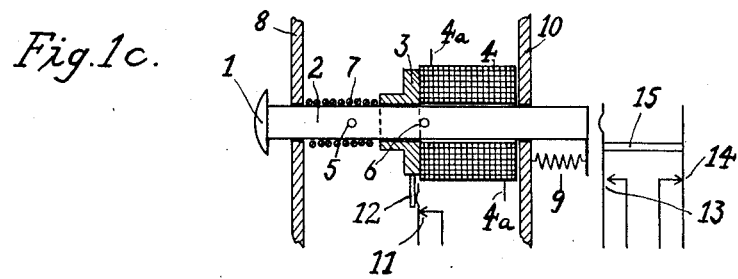

Referring now to Figs. 1a, 1b and 1c, a push button 1 is provided with a rod 2, and said push button can be pressed from the left to the right, viewed in Figs. 1a—1c. Armature 3 of an electromagnet 4 provided with leads 4a, is positioned and adapted to slide on said rod 2. Armature 3 is kept in a position spaced from wall 8 by a cylindrical helical spring 7. A second helical spring 9 is fastened with one of its ends on the stationary wall 10, while its opposite end is connected with the end of rod 2, as shown. The diagrammatically illustrated pair of springs 11 represents an electric switch which can be opened or closed through the action of pin 12 fastened on armature 3, by moving said armature correspondingly. This pair of springs 11 is closed by the electrical attraction of armature 3 by coil 4 or by pushing rod 2 manually. Two further electric switches are formed by the two pairs of springs 13 and 14, the opening and closing of which is effected only in connection with the manual action of moving rod 2. The insulating member 15 connects one spring of switch 13 with a spring of switch 14.

Fig. 1a shows the push button mechanism according to my invention in the rest position. In this position, the magnet winding 4 is without current, and armature 3 is kept in its rest position by the pull of spring 9 on rod 2, and is kept against pin 6 by the action of spring 7. At this position, the switches 11 and 13 are open, while switch 14 is closed.

Fig. 1b shows the push button pressed by hand into its deepest position. When the push button is pressed by hand, rod 2 is caused to slide into coil 4. Due to the space between pins 5 and 6, armature 3 remains in its original position until it is engaged by pin 5. The motion of rod 2 and armature 3 is finished as soon as armature 3 is prevented from traveling any further by striking coil 4. By said movement of rod 2, spring switches 13 and 14 have been actuated, so that switches 11 and 13 are closed while switch 14 will be open.

As soon as the pressure manually exerted on push button 1 is relieved, rod 2 of the push button begins to move back to the position shown in Fig. 1c under the action of spring 9. The back movement of rod 2 from the position shown in Fig. 1b into that shown in Fig. 1c, is stopped by pin 6 as soon as said pin 6 reaches armature 3 which is held attracted by the electromagnet if coil 4 is energized. Shortly after the back movement of the push button has started, switch 14 will be closed, while switch 13 is still closed. Thus, during transition from the position shown in Fig. 1b into that shown in Fig. 1c, both switches 13 and 14 are closed for a short period of time. In the position shown in Fig. 1c, however, switches 11 and 14 are closed, and switch 13 is open.

This position shown in Fig. 1c also occurs, in a manner described in detail further below, when in the position shown in Fig. 1a, the magnet winding 4 is energized by remote control. The energized electromagnet attracts armature 3, and causes movement of the push button by means of pin 6 into the position shown in Fig. 1c.

Figure 2:
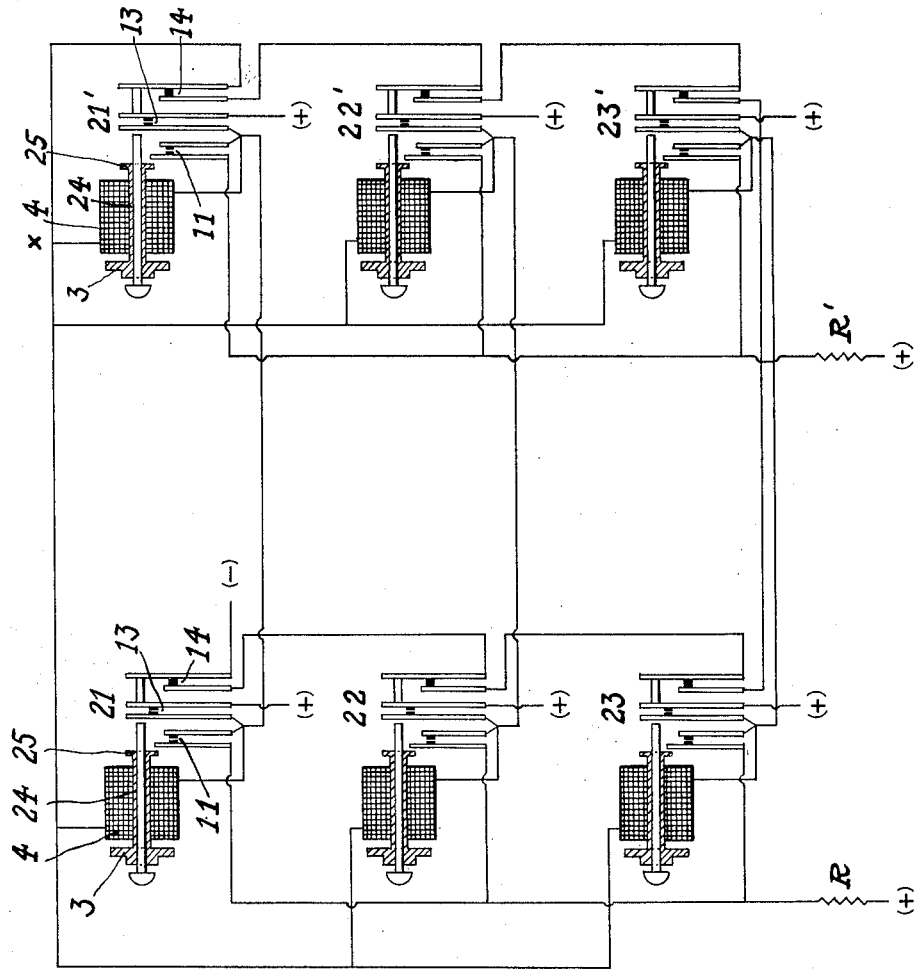
Fig. 2 shows, by way of example, the wiring diagram of an arrangement of two coordinated control devices, each of which includes 3 push button sets.

Fig. 2 shows, by way of example, a wiring diagram of two push button units interconnected according to my invention, each of said push button units consisting of 3 push button sets of substantially identical construction, generally designated with reference numbers 21, 22, 23, and 21', 22' and 23'. As shown in the drawing, the units which comprise sets 21, 22, 23 and 21', 22', 23', respectively, and may be located in different compartments, are connected by five leads. If the operator wants to operate sets 21 and 21', he will press, for example, the push button of act 21 until it reaches its deepest position. On the action of the manual pressure, switches 11 and 13 will close while switch 14 will open. At this point all current will be interrupted in view of the fact that the common negative return feeding all coils has been interrupted by breaking spring switch 14. When manual pressure is relieved, spring switch 14 will immediately close. Inasmuch as spring 13 has remained closed, now the current originating from the positive terminal connected with one of the springs 13 will pass through its contacts, and will actuate coils 4 of push button sets 21 and 21' whose return leads join at x, and traveling through the common return series contacts formed by all spring switches 14, will eventually return to the negative pole of the battery. During the short period of time, in which, on the return way of the manually depressed push button, switch 13 is closed, the current will actuate the armature in the push button set under remote control, for example, in set 21'.

As this has occurred, a positive voltage reduced by the action of resistance R and R₁ will pass through windings 4 of the coils of sets 21 and 21' by means of switch spring 11 and its counterpart in 21', thus producing a reduced magnetic field sufficiently strong to retain in place armature 3 of set 21 and its counterpart in set 21' even when manual pressure has completely ceased.

From the above description, it should be noted, therefore, that the act of manually pressing any push button causes its counterpart to be actuated by the full current, but thereafter a secondary or reduced current is called into play, and acts as a retaining current only, thus reducing the amount of wattage consumption and heat dissipation.

It should be evident therefore, that the manual pressing of any push button will first reset any other combination which may have been previously set up, by opening its corresponding set of springs 14 which deprives the entire system of its negative return. Furthermore, said manual pressing of any push button will energize two corresponding coils by closing the corresponding spring switch 13.

The system described above is used for switching on and actuating further electric circuits, for example in the manner customary in push button systems of radio receiving sets. These further circuits and the parts forming the same, have not been shown here, as they do not form a part of my present invention.

Figure 4:
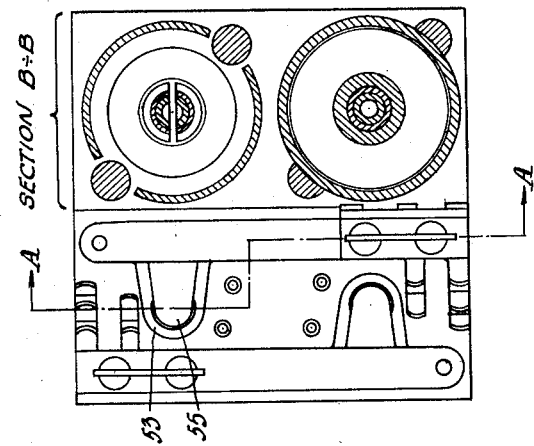
Figures 3 and 4 show in deail an embodiment of a push button set according to my invention in sectional view and front view.
Figure 3:
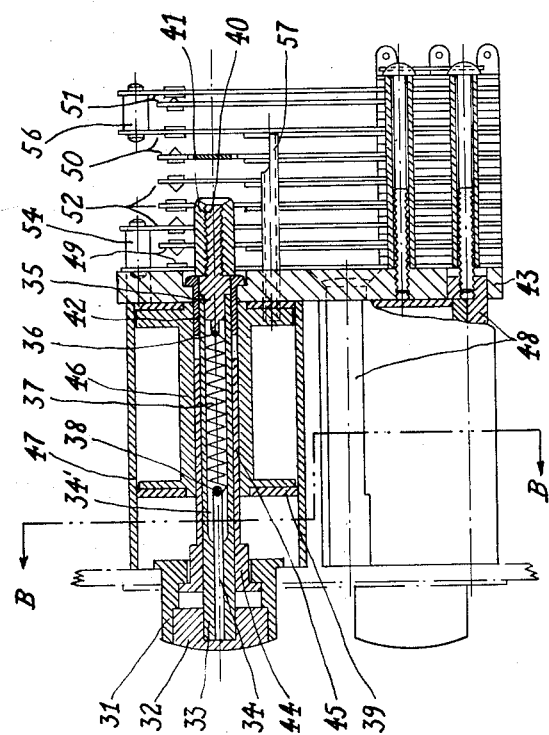

Figs. 3 and 4 illustrate, by way of example, a set of two push buttons according to my invention. Fig. 3 is a sectional view through line A—A of Fig. 4. The left portion of Fig. 4 is a front view, while the remaining portion is a sectional view taken through line B—B of Fig. 3.

Referring now in detail to Fig. 3, the push button comprises a barrel 31 in which a button 32 consisting of Bakelite or another suitable insulating material is forced. A push button rod 33 is molded into button 32, said push button rod 33 being provided with a slot 34 and a hole 34'. Stud 35 is firmly inserted into the end of said hole 34'. The inner end of said stud 35 carries an eye 36 for fastening one end of spring 37. The opposite end of said spring 37 is fastened on the holding pin 38 which in turn is fastened on the stationary washer 39. Slot 34 permits movement of the rod 33 to the right, viewed in Fig. 3, while pin 38, as already mentioned, remains stationary. An insulating tube 41 consisting of Bakelite or another suitable insulating material, is screwed on the threaded end 40 of stud 35. A flanged tube 42 consisting of a suitable insulating material, such as Bakelite, slides on rod 33, the movement of said flanged tube 42 relative to rod 33, being limited to the right, viewed in Fig. 3 by member 41, while its movement to the left is limited by its flange and the foundation plate 43. Armature 44 which is integral with tubular member 45, is also slidable on rod 33. Said armature 44 is slidable in the hole of coil spool 46. The magnetic winding is surrounded by the coil containing tube 47 which is held in place by mounting rods 48 fastened in foundation plate 43. The coils are connected to the electric source through terminals 57. The pairs of springs 49, 50 and 51 correspond to the pairs of springs 11, 13 and 14, respectively, while the three springs 52 are provided for actuating local circuits which do not form a part of my present invention. As shown in Fig. 4, the push button units are arranged in such a manner that their individual parts, and particularly the spring switches can be assembled within a relatively very small space.

In the position shown in Fig. 3, when a push button is pressed manually, it travels a certain distance before it engages and carries armature 44. During movement of the push button, tube 45 abuts against flanged tube 42, and causes said tube 42 to move to the right. Thereby, the flange of tube 42 abuts against projection 53 of the left spring of spring pair 49 whereby switch 49 will be closed. Springs 52 and the corresponding local circuits will then be actuated by means of insulating member 54. During the movement of the push button to the right, end member 41 of the push button will abut against the smaller projection 55 of the left spring of spring pair 50, thereby closing switch 50. When the manually actuated push button reaches its deepest position, switch 51 of the last pair of springs will be opened through insulating member 56. If the push button is pressed or the armature is attracted by the energized electromagnet, spring 37 will be loaded; the spring tension causes the push button to return in its original position, as soon as the manual pressure is relieved or the winding circuit is interrupted.

The operation of the device shown in Figs. 3 and 4 takes place in the manner explained in connection with Figs. 1 and 2 and will be understood from the above description of said figures.

As shown in the attached drawings and the above description armature 44, 45 does not directly actuate switch 49 but must travel to a certain distance before it engages element 42 which in turn actuates the pair of springs 49. Thus a considerable deflection of springs 49 which would be caused by direct actuation of switch 49 by means of said armature 44, 45, is avoided.

Figure 5:
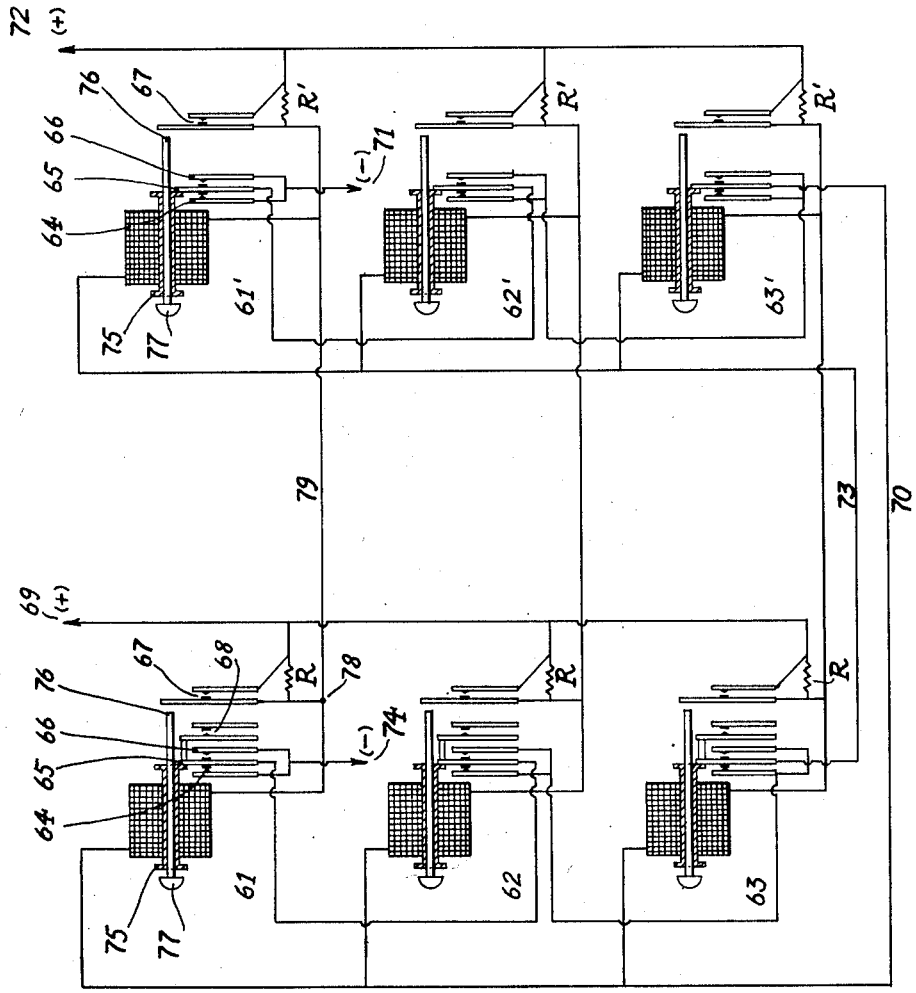
Fig. 5 shows the wiring diagram of a modified arrangement of two coordinated devices, each of which includes 3 push button sets.

Referring now to Figs. 5 and 6, Fig. 5 is the wiring diagram of a preferred embodiment of my invention, in which—with the exception of certain brief switching periods—a steady weak current is flowing through the devices included in the arrangement shown. The embodiment shown in this device is, to a certain extent, similar to that shown in Fig. 2, the arrangement of the switches as well as the connections of the same being, however, different from those in the embodiment of Fig. 2.

In the wiring diagram, shown in Fig. 5, two push button units are interconnected, each of these units consisting of 3 push button sets of substantially identical construction, generally designated with reference numbers 61, 62, 63, and 61', 62', 63'. Each of these sets comprises a throw-over switch consisting of springs 64, 65 and 66. The switch formed by springs 64 and 65 is closed in the rest position, while the switch formed by springs 65 and 66 is open. As shown in the drawings, springs 64 and 66 are electrically connected with each other. Furthermore, each push button set comprises another pair of springs 67. Each of the sets 61, 62 and 63 also comprises a spring pair 68 which simply represent a typical switch for actuating a local circuit. This pair of springs 68 may also be provided, instead of or in addition to those of the sets 61, 62, 63, in sets 61', 62', 63'. Instead of one of such pair of springs 68, several pairs may be provided in each set, if desired.

The push button sets and the switches are shown in Fig. 5 in their rest position. A weak electrical current flows in the windings of the push buttons in this position from the positive terminal 69, the resistances R, and the coils of the sets 61, 62 and 63, said coils together with their respective resistance being connected in parallel. The current flows through return lead 70 and through the switches of sets 63', 62' and 61' (said switches being formed by the respective springs 64, 65 and being connected in series) to the negative terminal 71. Similarly, a current flows from the positive terminal 72 through the resistances R', and the coils of push button sets 61', 62', 63', then through lead 73, and through the switches of push button sets 63, 62, 61 (said switches being formed by the respective springs 64, 65, and being connected in series) to the negative terminal 74. These currents are relatively weak, e. g. about 50 m. a. They are not strong enough to cause the individual armatures 75 to be moved by the action of the respective coils, they are however strong enough to energize the coils to such an extent that said coils retain the individual armatures once these armatures had been attracted under the action of a stronger current.

If a push button is manually depressed until it comes to the stop the corresponding switch 67 will be closed and thus the corresponding resistance short circuited by the action of the end 76 of the push button rod. Such manual actuation of a push button does not cause any change in the position and functioning of springs 64, 65, 66.

The operation of the device is as follows:

For actuating push button set 61 and its counterpart 61', the operator presses push button 77 until it comes to the stop. Thereby, as explained above, switch 67 will be closed and resistance R of push button set 61 short circuited. Therefore, a stronger current will flow from the positive terminal 69 through short circuited resistance R, said current being branched at 78. One part of the current flows through coil of set 61 and through return lead 70, in the manner explained above, to terminal 71. The other part of the current flows through lead 79 to the coil of set 61' and through lead 73, in the manner described above, to terminal 74. Thereby, the coils of sets 61 and 61' will be energized and the respective armatures 75 will be attracted by the coils. When the armature is attracted by its coil in set 61, the throw-over switch formed by springs 64, 65, 66 is brought from its rest position into another position, in which contact between springs 64 and 65 is broken, and contact between springs 65 and 66 is closed. Since springs 64 and 66 are electrically connected, this new position of the throw-over switch is electrically equivalent to the rest position of the same. During the procedure of switching, however, the electric connection to the negative terminal 74 is interrupted for a short period of time, whereby the return lead of all coils in sets 61', 62', 63' is also interrupted for a short period of time. All previous settings in sets 61', 62', 63' will be thus cancelled, because the armatures of said sets will be released from the respective coils.

Similarly, the armature of set 61' will be attracted by the respective coil under the action of the full current passing through said coil, and the throw-over switch of the set 61', which is formed by springs 64, 65, 66, is brought into a changed position from the rest position shown in the drawings. The connection to the negative terminal 71 will then be interrupted, in a manner similar to that explained before, for a short period of time, and the coils of sets 61, 62, 63 will then be without current, all previous settings in sets 61, 62, 63 being thereby cancelled.

The armatures in sets 61 and 61' will be attracted by the respective coils either simultaneously or with a slight difference in time. This will not affect the operation of the arrangement shown, because, after a very short period of time, a steady state is attained, in which both throwover switches are in the operative position.

If the manual pressure exerted on the push button set 61 is relieved, short circuiting of the resistance will be interrupted, and the current in the coils of sets 61 and 61' will be reduced to the before-mentioned low amount which is sufficient for retaining the armature in its attracted position.

The local circuit in set 61 will now be actuated by switch 68 being closed in the example shown.

A characteristic feature of the preferred embodiment of my invention illustrated in Fig. 5 consists in that the cancellation of all previous settings in sets 61, 62 and 63 is effected by the throw-over switches included in sets 61', 62' and 63', and vice versa. If the switch which effects cancellation of the previous settings was included in the set to be operated, a buzzer effect would occur in said set, while in the arrangement shown, a stationary condition is immediately attained.

Fig. 6 shows details of construction of two push button sets which are adapted to be used in the arrangement shown in Fig. 5. The upper set in this figure is shown in the rest position, while the push button of the lower sets is shown in a position manually depressed until it comes to the stop. Although the construction shown in Fig. 6 is generally similar to that shown in Figs. 3 and 4, the following differences should be noted.

The springs 64ˣ, 65ˣ, 66ˣ form the throw over switch shown in Fig. 5. Spring pairs 68ˣ and 68ʸ serve for actuating local circuits, while switch 67ˣ corresponds to short-circuit switch 67 shown in Fig. 5. When button 77ˣ is manually pressed to the right, viewed in Fig. 6, spring 80 will be slightly compressed and armature 75ˣ will be caused to move to the right until it abuts against flanged tube 81. When button 77ˣ is further pressed to the right, spring 80 will be further compressed, while no further movement of the armature and of the flanged tube 81 will occur, because said flanged tube is now prevented from being moved by spring 65ˣ which is substantially stronger than spring 80. The lower portion of Fig. 6 shows the parts in a condition when the push button is completely depressed, and it appears that, in this condition, the position of flanged tube 81 has not changed in comparison to the rest position shown in the upper portion of the drawings, while spring 80 has been strongly compressed.

In the lower push button set of Fig. 6, the armature is shown in a non-energized condition, in which said armature is not attracted by the coil. The push button, however, is shown in its deepest position, in which, as explained above, short circuit switch 67ˣ is closed, and this practically causes immediate attraction of said armature. For the sake of clearness, however, the armature is shown in the position before it is attracted by the coil.

As soon as the coil is energized, the armature will be attracted by the coil, and the flanged tube 81 will be caused to move to the right, viewed in Fig. 6, while overcoming the resistance of spring 65ˣ, and causing the throw over switch to move into the operative position. In this position, switches 68ˣ and 68ʸ, which serve for actuating local circuits, will be closed through insulating pieces 82.

If the manual pressure exerted on the push button is relieved, springs 80 and 67ˣ will cause said push button to move to the left, viewed in Fig. 6, until it is stopped by stop 83 of the armature. The weak electric current which is flowing now through the coil is, however, sufficient for keeping the armature in its attracted position.

The embodiment of my invention illustrated in Figs. 5 and 6, has the important advantage that if the pushbutton is not completely depressed, no change will occur, and, therefore, a new combination can never be set up prior to the cancellation of the previously selected combination.

It is to be understood that the invention is not limited to the embodiments shown, but may be embodied in various equivalent forms and arrangements as may be desired. As various changes in construction and arrangement of parts may be made without departing from the spirit of the invention as will be apparent to those skilled in the art, reference will be had to the appended claims for a definition of the limits of the invention.

I claim:

1. In a system of coordinated control devices for local and remote operation of electric circuits, said control devices being provided with depressible members and adapted to be electrically connected in a circuit, means for supplying current to said circuit, means for interrupting the flow of current in said circuit and resetting any previously set up combination in said devices, upon depressing one of the depressible members in one of said devices; means for actuating the depressible members corresponding to said depressed member of the coordinated devices by the electromagnetic action of a full current, and means for retaining said depressible members in their operative position by the electromagnetic action of a reduced current.

2. In a system of coordinated control devices for local and remote operation of electric circuits, said control devices being provided with depressible members and adapted to be electrically connected in a circuit, means for supplying current to said circuit, means for interrupting the flow of current in said circuit and resetting any previously set up combination in said devices, prior to the actuation of a selected setting, upon depressing one of the depressible members in one of said devices, means for actuating the depressible members corresponding to said depressed member of the coordinated devices by the electromagnetic action of a full current, and means for retaining said depressible members in their operative position by the electromagnetic action of a reduced current, upon relieving the manual pressure exerted on said depressible member in one of said devices.

3. In a system of coordinated control devices for local and remote operation of electric circuits, said control devices being provided with depressible members and adapted to be electrically connected in a circuit, means for supplying current to said circuit, means for interrupting the flow of current in said circuit and resetting any previously set up combination in said devices, prior to the actuation of a selected setting, upon manually depressing one of the depressible members in one of said control devices, means for actuating the depressible members corresponding to said depressed member of the coordinated control devices by the electromagnetic action of a full current, and means for retaining said depressible members in their operative position by the electromagnetic action of a reduced current, upon relieving the manual pressure exerted on said depressible member in one of said control devices, and means for actuating local electric circuits of the device to be controlled.

4. In a system of coordinated control devices for local and remote operation of electric circuits, said control devices being provided with push buttons, and adapted to be electrically connected in a circuit, means for supplying current to said circuit, each of the push button sets in said control devices being provided with means for interrupting the flow of current in said circuit and thereby resetting any previously set up combination in said system upon manually depressing one of the push buttons in one of said control devices, each of said push button sets being also provided with electromagnetic means for actuating the push button of the other control devices, which corresponds to said manually depressed push button, and with means for actuating local circuits in the device to be controlled, the heat dissipation in said system being limited to an amount not injurious to said system by applying full current to said electromagnetic means for actuating push buttons and for a short period of time only, and applying reduced current to said electromagnetic means for retaining push buttons in their operative position.

5. In a method for the coordinated control of electric circuits of a system by means of at least two control devices adapted to be electrically connected in a circuit and provided with push buttons actuating local circuits in the system to be controlled, said method comprising resetting any previously set up combination by interrupting the flow of current in said circuit, selecting a predetermined setting in one of said control devices, effecting a corresponding setting in the coordinated control devices by electromagnetic control means, actuation of the members of the control devices being effected by applying a full current, while retaining of said members in their operative position being effected by applying a reduced current to said electromagnetic control means.

6. In a system of coordinated control devices for local and remote operation of electric circuits, said control devices being provided with push buttons, and adapted to be electrically connected in a circuit, manually actuating one of said push buttons for the selection of a predetermined setting, and using electromagnetic control means for actuating and retaining in their position the corresponding members of the coordinated control devices, said electromagnetic means being fed by a full current for actuating said members and for a short period of time only, and being fed by a reduced current for retaining said members in their operative position.

7. A system of the type set forth for the coordinated adjustment of control devices for local and remote operation of electric circuits, said system comprising at least two control devices adapted to be electrically connected in a circuit, and provided with push button sets, each of said push button sets comprising a depressible button provided with a rod adapted to be actuated manually and electrically, and adapted to occupy a first or rest position, a second or working position, and a third or deepest position, each of said push button sets also comprising a magnet winding and a movable armature, said magnet winding, on being energized with full current, being adapted to attract said armature, and, on being energized with reduced current, being adapted to retain said attracted armature, said armature being adapted to engage and to cause to move said rod; each of said push button sets being provided with means for interrupting the flow of current and resetting any previously set up combination in said electrically connected control devices, upon manually depressing said rod into its deepest position, with means for energizing said magnet winding with full current in the corresponding push button set of the coordinated control devices for a short period of time upon relieving the manual pressure exerted on said rod, and with means for energizing said magnet winding with reduced current in said corresponding push button set of the coordinated control devices.

8. A push button set adapted to be used in a system of the type set forth for the coordinated adjustment of control devices adapted to be electrically connected in a circuit, said push button set comprising a push button provided with a rod adapted to be actuated manually and electrically, and adapted to accupy a first or rest position, a second or working position, and a third or deepest position, a magnet winding and an armature, said magnet winding, on being energized with full current, being adapted to attract said armature and, on being energized with reduced current, being adapted to retain said attracted armature, said rod passing through said armature and said magnet winding; said armature being adapted to engage and to cause to move and to retain said rod, a switch member actuated by said armature and two further switch members actuated by said rod, a spring member for keeping said armature in spaced position from the wall of said push button set, and a further spring member fastened on a stationary member, and on one end of said rod.

9. In a system of coordinated control devices for local and remote operation of electric circuits, said control devices being provided with depressible members and operating on a closed circuit, means for supplying current to said circuit; means for resetting any previously set up combination in said control devices upon manually depressing one of the depressible members in one of said control devices, said resetting being caused by interruption of the flow of the steady current in said circuit, said manual depression of said one of the depressible members, by the electromagnetic action of a working current, also causing actuation, in the operative position, of the depressed member, and actuation in the operative position of the depressible member corresponding to said depressed member in the coordinated control devices, means for retaining said manually depressed member and the corresponding members of the coordinated control devices in said operative position, upon relieving the manual pressure exerted on said depressed member, by the electromagnetic action of the steady current, and means for actuating local circuits in the system to be controlled.

10. A system of the type set forth for the coordinated adjustment of control devices for local and remote operation of electric circuits, said system comprising at least two control devices which operate on a closed circuit and are provided with push button sets, each of said push button sets comprising a depressible button provided with a rod adapted to be actuated electrically, each of said push button sets also comprising a magnet winding and a movable armature, said magnet winding, on being energized with full working current, being adapted to attract said armature, and, on being energized with reduced, steady current, being adapted to retain the attracted armature, said armature being adapted to engage and to cause to move said rod, each of said push button sets being provided with means for interrupting the flow of steady current and thereby resetting any previously set up combination in the control devices of said system and means for energizing said magnet winding with full or working current in the set of the depressed push button and in the corresponding push button set of the coordinated control device for a short period of time only upon manually depressing said push button into its deepest position, and with means for energizing said magnet winding in the set of the depressed push button and in the corresponding push button set of the coordinated control devices with reduced, steady current after said short period of time.

11. A system as claimed in claim 9, wherein the means for causing interruption of the steady current and resetting a combination previously set up in the control devices, are located in a coordinated, remote control device, and vice versa.

12. A system as claimed in claim 10, wherein the means for causing interruption of the steady current and resetting a combination previously set up in the control devices, are located in a coordinated, remote control device, and vice versa.

13. In a method for the coordinated control of electric circuits of a system, by means of at least two control devices operating on a closed circuit, and provided with push buttons actuating local circuits in the system to be controlled, said method comprising resetting any previously set up combination by interrupting the flow of steady current in said system; selecting a predetermined setting in one of said control devices and effecting a corresponding setting in the coordinated control devices by electromagnetic control means, actuation of the members of said control devices being affected by applying a full, working current, while retention of said members in their operative position is effected by applying the steady current to said electromagnetic control means.

WILLIAM A. BRUNO.